United States Patent
Murakami et al.

(10) Patent No.: US 7,965,012 B2
(45) Date of Patent: Jun. 21, 2011

(54) ELECTRONIC MOTOR

(75) Inventors: Masanori Murakami, Kawasaki (JP); Pairoj Patisonticharoen, Kawasaki (JP); Chanaporn Thanathitipong, Kawasaki (JP); Wijittra Jabtanom, Kawasaki (JP)

(73) Assignee: Fujitsu General Limited, Kanagawa-ken (JP)

( * ) Notice: Subject to any disclaimer, the term of this patent is extended or adjusted under 35 U.S.C. 154(b) by 0 days.

(21) Appl. No.: 12/654,720

(22) Filed: Dec. 30, 2009

(65) Prior Publication Data
US 2010/0181863 A1     Jul. 22, 2010

(30) Foreign Application Priority Data
Jan. 16, 2009   (JP) ................. 2009-008226

(51) Int. Cl.
*H02K 3/38*  (2006.01)
*H02K 15/04* (2006.01)
(52) U.S. Cl. ........................................ 310/194
(58) Field of Classification Search .................. 310/194
See application file for complete search history.

(56) References Cited

U.S. PATENT DOCUMENTS

| | | | | |
|---|---|---|---|---|
| 6,034,461 | A * | 3/2000 | Sun | 310/216.022 |
| 6,177,751 | B1 * | 1/2001 | Suzuki et al. | 310/269 |
| 6,531,802 | B2 * | 3/2003 | Umeda | 310/263 |
| 6,984,911 | B2 * | 1/2006 | Horie et al. | 310/194 |
| 7,111,380 | B2 * | 9/2006 | Sheeran et al. | 29/596 |
| 7,340,822 | B2 * | 3/2008 | Yamamura et al. | 29/598 |
| 7,382,075 | B2 * | 6/2008 | Wang et al. | 310/260 |
| 2002/0084716 | A1 * | 7/2002 | Harter et al. | 310/258 |
| 2004/0051417 | A1 * | 3/2004 | Yamazaki et al. | 310/216 |
| 2006/0033395 | A1 * | 2/2006 | Izumi et al. | 310/208 |

FOREIGN PATENT DOCUMENTS
JP   H05-191941   7/1993
JP   2008-072801  3/2008

* cited by examiner

*Primary Examiner* — Burton Mullins
(74) *Attorney, Agent, or Firm* — Manabu Kanesaka

(57) ABSTRACT

There is provided an electronic motor in which a stator core is thinned to obtain an increased diameter of a rotor is to produce a high power output, and a stator can be positioned with high accuracy at the time when a coil is wound on the stator. The outside peripheral surface of a yoke part 31 is substantially the same as the outside peripheral surface of a flange 42 of an insulator 4, and in a part of the flange 42, a cut-away part 43 is provided to expose a part of the end face of a stator core 30.

5 Claims, 6 Drawing Sheets

ELECTRONIC MOTOR

CROSS-REFERENCE TO RELATED APPLICATIONS

The present application is based on, and claims priority from, Japanese Application Serial Number JP2009-008226, filed Jan. 16, 2009, the disclosure of which is hereby incorporated by reference herein in its entirety.

TECHNICAL FIELD

The present invention relates to an inner rotor type electronic motor in which a rotor is coaxially disposed in the center of a stator. More particularly, it relates to a high-power electronic motor realized by increasing the diameter of the rotor while the outside diameter of the stator is unchanged.

BACKGROUND ART

A general inner rotor type electronic motor includes: a stator that has a cylindrical stator core having a plurality of teeth parts integrally projecting from the inside peripheral surface of a ring-shaped yoke part toward the center and has an insulator surrounding the teeth parts leaving at least a teeth surface of the stator core open; and a rotor that is disposed coaxially in the center of the stator.

One approach for increasing the power output and efficiency of the inner rotor type electronic motor of this type is to increase the diameter of the rotor. Increasing the diameter of rotor, however, increases the diameter of the stator accordingly in the conventional art, which in turn increases the size of the entire electronic motor.

Accordingly, one approach for increasing the size of rotor with the outside dimension of stator being unchanged, is to reducing the thickness in the radial direction of the yoke part of the stator core to enlarge the inside diameter of stator. Reducing the thickness of the yoke part of stator core to thin the stator core, however, poses a problem as described below in a process of winding a coil on the stator.

For example, the conventional stator core has been formed so as to have a slightly large diameter in such a manner that the yoke part has a thickness larger in the radial direction and the outside peripheral surface of the yoke part protrudes to the outside from the outside diameter of the insulator.

Accordingly, when the coil is wound on the stator core, the stator core is positioned while the stator core is brought into contact with a washer provided on the winding machine side using the portion protruding to the outside of the stator core as a reference plane for the positioning.

Therefore, if a thinned stator is used, this reference plane could not be available, which means that positioning cannot be performed at the time of coil winding. It is conceivable to hold and secure the outside peripheral surface of the stator core. However, the outside peripheral surface has not usually been held because the stator core has a relatively low rigidity.

The present invention has been made to solve the above problems, and accordingly an object thereof is to provide an electronic motor in which a stator core is thinned to obtain an increased diameter of a rotor to produce a high power output, and a stator can be positioned with high accuracy at the time when a coil is wound on the stator.

SUMMARY OF THE INVENTION

To achieve the above object, the present invention has some features described below. An electronic motor is provided, which includes a stator and a rotor, the stator having a cylindrical stator core having a plurality of teeth parts integrally projecting from the inside peripheral surface of a ring-shaped yoke part toward the center, the stator further having an insulator surrounding the teeth parts leaving at least a teeth surface of the stator core open, and the rotor being disposed coaxially in the center of the stator, wherein the insulator has a sleeve extending along the teeth part from the end face side of the stator core, and a flange formed integrally at one end of the sleeve to cover the end face of the stator core, wherein in the stator core, the outside peripheral surface of the yoke part is substantially the same as the outside peripheral surface of the flange of the insulator, and wherein in a part of the flange, a cut-away part is provided to expose a part of the end face of the stator core.

According to this configuration, since the cut-away part is provided in a part of the flange of insulator to expose a part of the end face of the stator core, positioning can be performed reliably by bringing a positioning means of a winding machine into contact with the cut-away part. Further, as a result of the thinning of the stator core, the size of the rotor can be increased, which in turn enables the electronic motor to produce a high power output.

As a preferable mode, the cut-away part is provided at least at three places at predetermined intervals.

According to this configuration, since the cut-away part is provided at least at three places at predetermined intervals, positioning can be performed by using the end face of the stator core.

Also, the insulator is divided into at least three insulator members, the insulator members are combined together to form the insulator of a ring shape, and the cut-away part is provided in the butting surface of the flange.

According to this configuration, since the cut-away parts are provided in each of the butting surfaces of the flanges of the at least three insulator members divided, the cut-away parts can be formed simultaneously, so that the manufacturing cost and the assembling cost can be reduced.

As a further preferable mode, the insulator members are separated for each teeth.

According to this configuration, since the insulator members are separated for each teeth, the cost can be reduced further by the standardization of the insulator members. Further, the maintenance work is easy to do because of the separation.

Also, when the outside diameter of the stator core is φ1 and the inside diameter thereof is φ2, the inside/outside diameter ratio (φ2/φ1) of the stator core is 70% and more.

According to this configuration, when the outside diameter of the stator core is φ1 and the inside diameter thereof is φ2, since the inside/outside diameter ratio (φ2/φ1) of the stator core is 70% and more, the diameter of the rotor can be increased without changing the outside diameter of the stator, so that utilization of torque generated in a predetermined motor size can be maximized.

DETAILED DESCRIPTION

Figure 1:
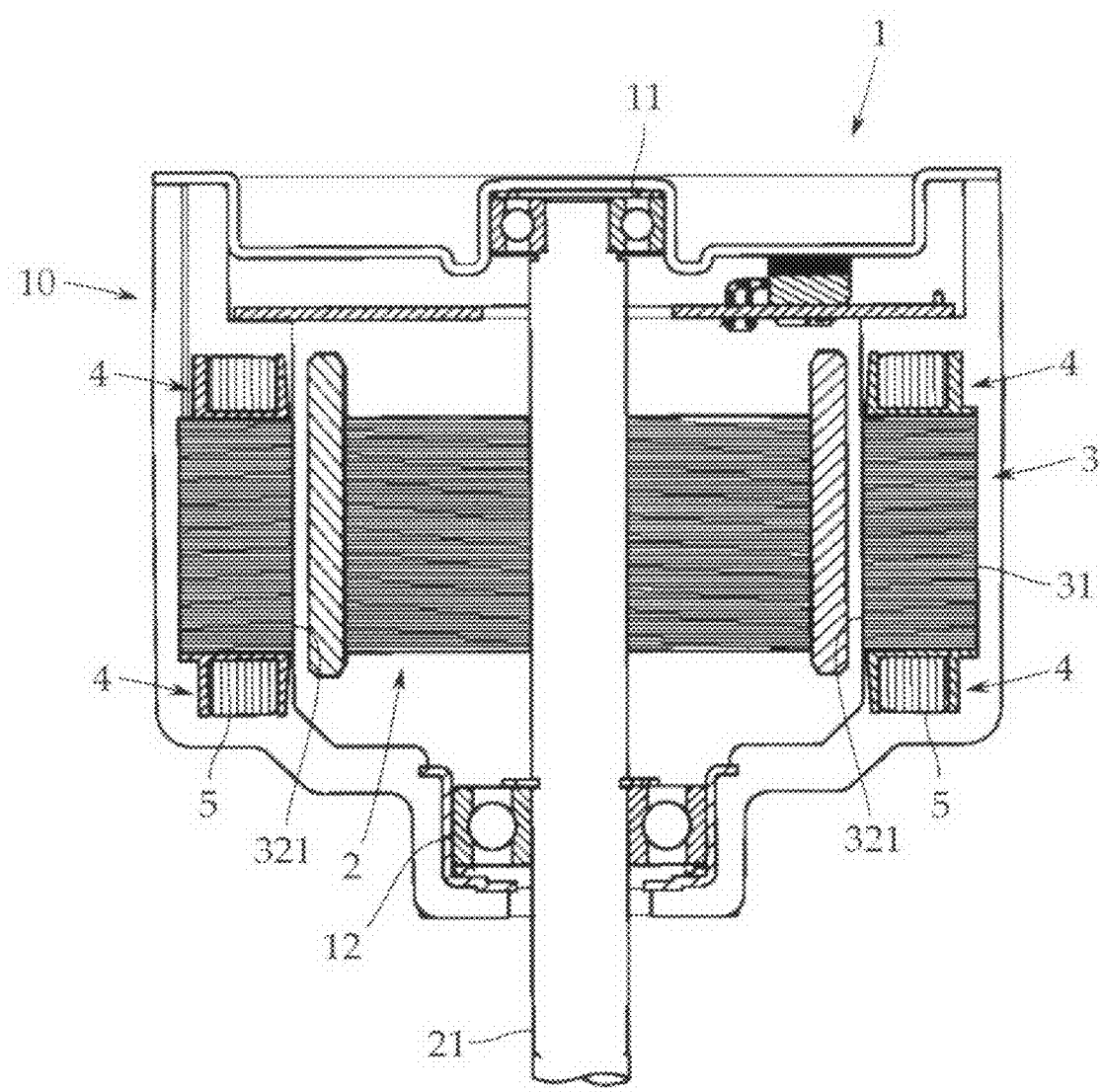
FIG. 1 is a schematic sectional view of an inner rotor type electronic motor in accordance with one embodiment of the present invention.

An embodiment of the present invention will now be described with reference to the accompanying drawings. The present invention is not limited to this embodiment. As shown in FIG. 1, an electronic motor 1 is an inner rotor type electronic motor including a rotor 2 having a rotating output shaft 21 and a stator 3 disposed coaxially at the outside periphery of the rotor 2.

The rotor 2 and the stator 3 are housed in a resin-made bracket 10 formed by one-piece molding of a resin. The rotating output shaft 21 of the rotor 2 is supported on bearing parts 11 and 12 in the bracket 10 at two points, and one end thereof is pulled out to the outside of the bracket 10.

In the present invention, the rotor 2 may be a rotor with a permanent magnet, or may be any type of rotor, such as a cage rotor or a wound rotor, that has the basic configuration of inner rotor type rotor. The specific configuration of the rotor 2 is optional.

Figure 2:
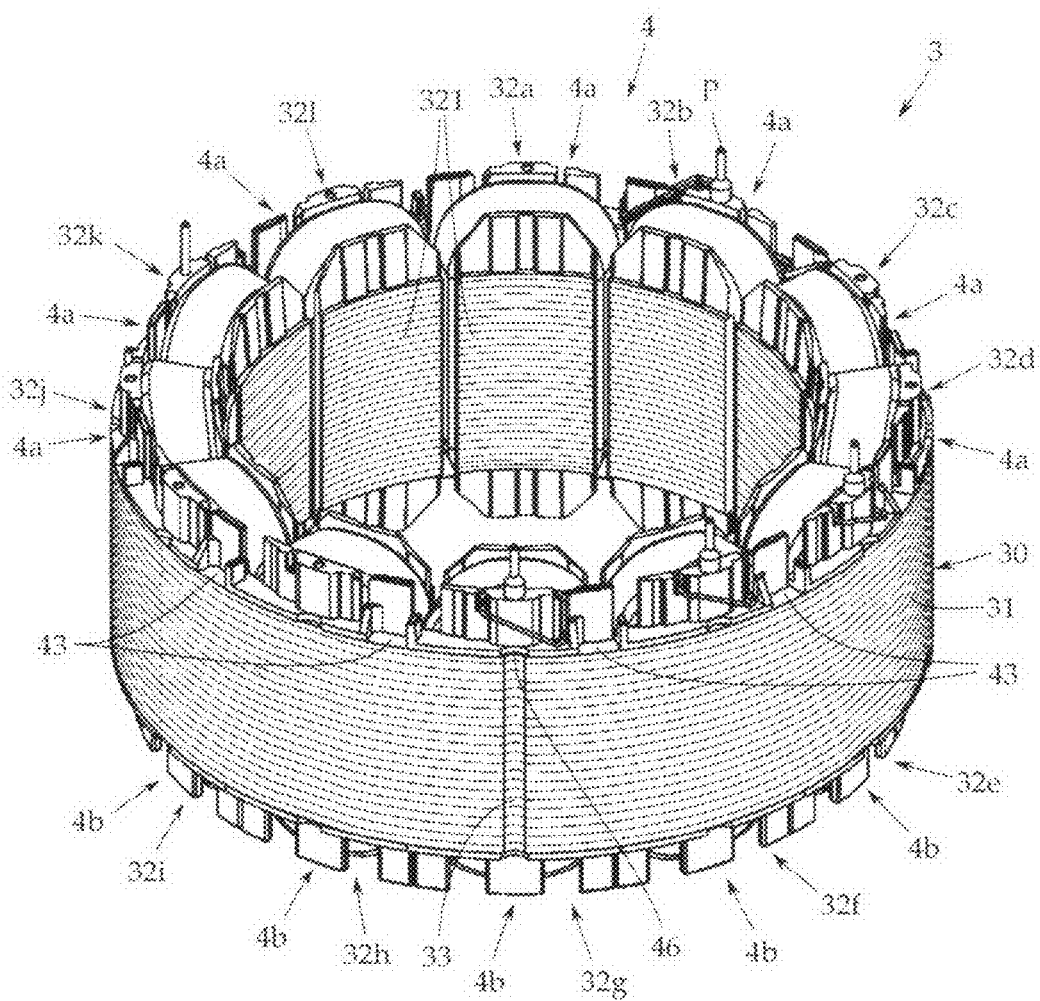
FIG. 2 is a perspective view of a stator of the electronic motor shown in FIG. 1.

Referring additionally to FIG. 2, the stator 3 includes a yoke part 31 formed in a ring shape, and a stator core 30 in which a plurality of teeth parts (magnetic pole teeth) 32a to 32l are provided so as to project from the inside peripheral surface side of the yoke part 31 toward the magnetic pole surface of the rotor 2.

The stator core 30 is formed by being stamped out from a magnetic steel sheet in a state in which the yoke part 31 and the teeth parts 32a to 32l are formed in a ring shape and simultaneously by being laminated. In this embodiment, twelve teeth parts 32a to 32l are provided. However, the number of teeth parts is optional according to the specifications.

Figure 3:
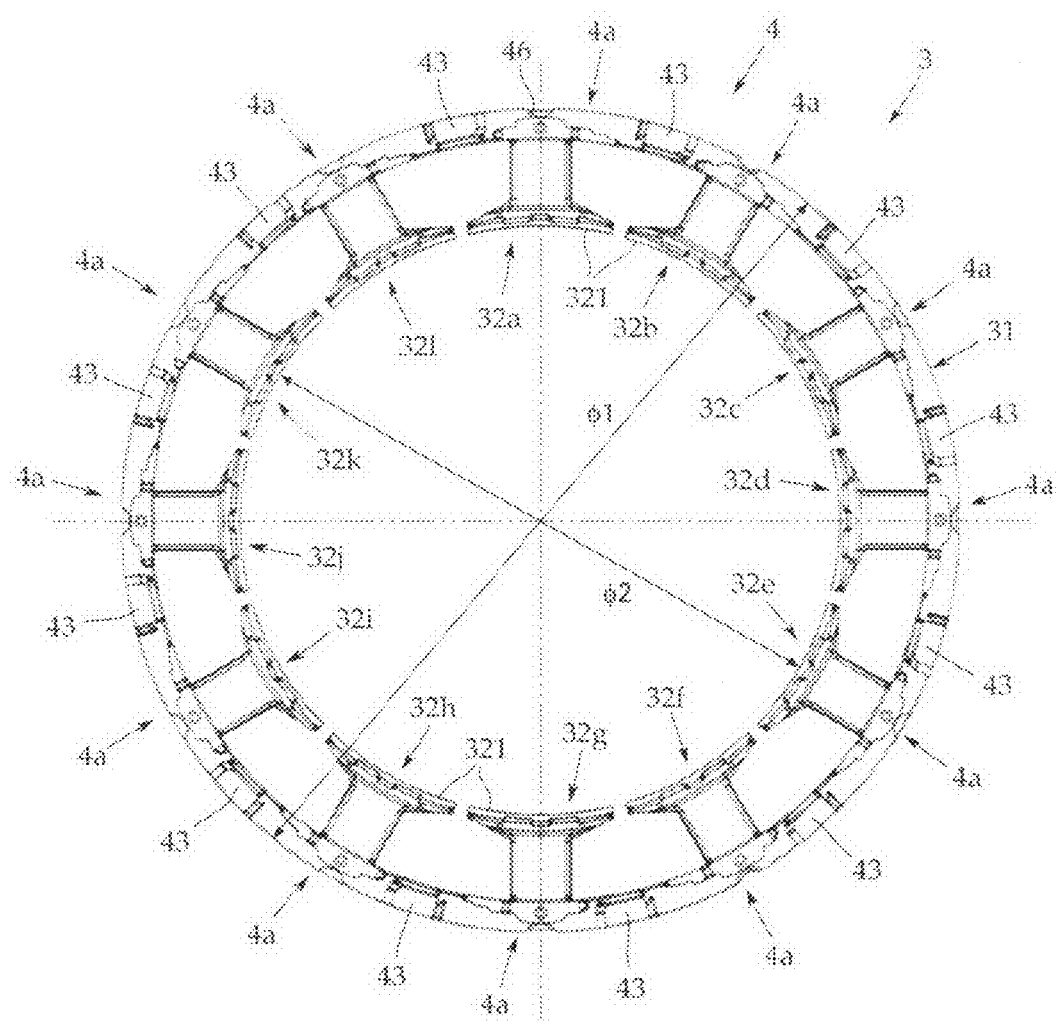
FIG. 3 is a plan view of the stator shown in FIG. 2.

Referring additionally to FIG. 3, taking the outside diameter of the stator core 30 as $\phi 1$ and the inside diameter thereof as $\phi 2$, the stator core 30 is designed so that the inside/outside diameter ratio ($\phi 2/\phi 1$) thereof is 70% and more. In this embodiment, the thickness in the radial direction of the yoke part 31 is 3.0 mm, the outside diameter $\phi 1$ of the stator core 30 is 100 mm, and the inside diameter $\phi 2$ thereof is 71.5 mm. Therefore, the stator core is designed so that the inside/outside diameter ratio is 71.5%.

According to this configuration, by setting the inside/outside diameter ratio ($\phi 2/\phi 1$) of the stator core 30 at 70% and more, the diameter of the rotor relative to the stator can be increased more, and high power output and high efficiency can be achieved without increasing the diameter of the stator 3.

The stator core 30 has an insulator 4 integrally attached thereto. The insulator 4 is formed so as to have an outside periphery approximately equal to the outside periphery of the stator core 30. That is to say, the configuration is made such that, when the stator 2 is viewed from the upside (end face side in the axial direction), at least the yoke part 31 of the stator core 30 is included in the projected area of the insulator 4.

As shown in FIG. 2, each of the teeth parts 32a to 32l is surrounded by the insulator 4 on the outside periphery thereof leaving a teeth surface 32l at the extreme end open. In this embodiment, the insulator 4 consists of segments molded out of an insulating synthetic resin each formed separately for each of the teeth parts 32a to 32l, which are combined to close the outside peripheries of the teeth parts 32a to 32l.

In this embodiment, twelve segments of insulator 4 are provided for the teeth parts 32a to 32l, respectively. Since the segments of insulator 4 have the same shape, hereunder explanation is given with reference to the insulator for the teeth part 32a as an example.

The segment of insulator 4 has a two-piece configuration consisting of a first insulator member 4a attached from the upper end side (the upper end side in FIG. 2) of the stator core 30 and a second insulator member 4b attached from the lower end side (the lower end side in FIG. 2) of the stator core 30.

Figure 4A:
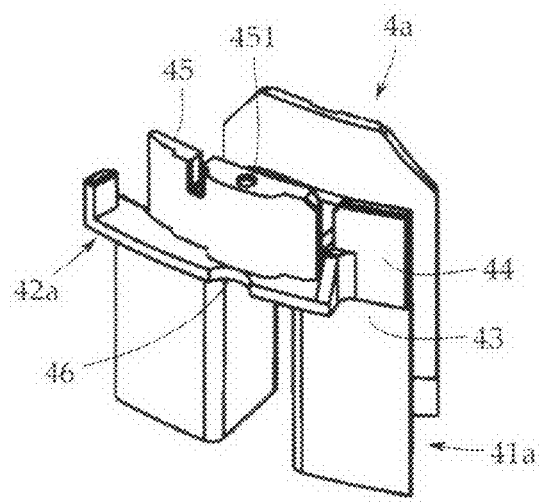
FIGS. 4A to 4C are a front perspective view, a back-side perspective view, and a plan view, respectively, of a first insulator member.
Figure 4B:
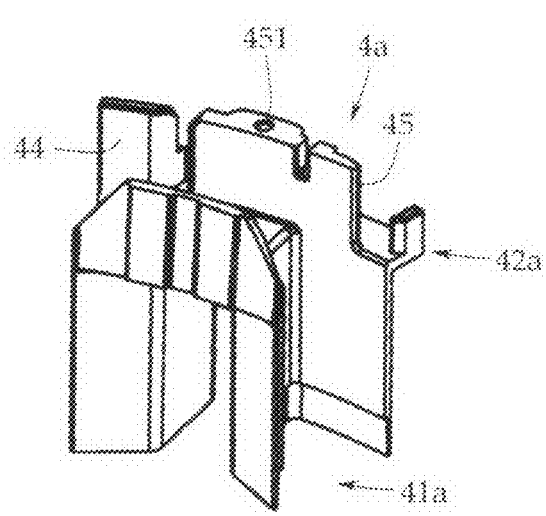

Referring to FIG. 4, the first insulator member 4a includes a first sleeve 41a inserted along the teeth part 32a to 32l from the upper end face of the stator core 30 and a first flange 42a formed integrally at one end (the upper end in FIG. 4A) of the first sleeve 41a.

The first sleeve 41a is formed so as to have a U-shaped cross section that covers the range from the inside peripheral surface of the yoke part 31 to the back surface of the teeth surface 32l through the coil part of the teeth part 32a, and is formed so as to be slightly longer than a half of the length in the axis line direction of the teeth part 32a.

In this embodiment, the extreme end of the first sleeve 41a is formed so as to be slightly thinner than other portions, and laps on the extreme end of a second sleeve 41b of the second insulator member 4b, described later, so that the first insulator member 4a and the second insulator member 4b engage with each other.

The first flange 42a is formed in a fan shape so as to cover a part of the upper end face of the yoke part 31 of the stator core 30. The first flange 42a is in contact with the upper end face of the stator core 30, and therefore also plays a role as a stopper for the first sleeve 41a inserted along the teeth part 32a to 32l from the upper end face of the stator core 30.

Figure 4C:
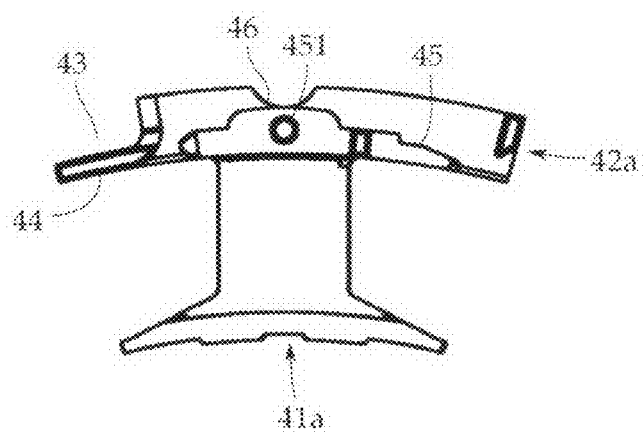

As shown in FIG. 4C, at one end (the left end in FIG. 4C) in the circumferential direction of the first flange 42a, a cut-away part 43 is provided to expose a part of the upper end face of the stator core 30. In this embodiment, the cut-away part 43 is cut into an L shape from the one end side to the center of the first flange 42a. However, the shape of the cut-away part 43 is not limited to this shape.

In place of the cut-away part 43, any construction penetrating along the axial direction, for example, a through hole may be provided to expose a part of the upper end face of the stator core 30. Further, when the first flanges 42a of the adjacent segments of insulator are abut against each other, a gap may be formed therebetween.

To prevent the coil from touching the stator core 30 exposed by the cut-away part 43, an L-shaped protective wall 44 is erectingly provided along the cut-away part 43 on the first flange 42a. In this embodiment, the protective wall 44 is also used as a guide at the time of the treatment of connecting wire.

The first flange 42a is further provided erectingly with a guide plate 45 used for the treatment of connecting wire of a coil 5. The guide plate 45 is formed in a bow shape along the first flange 42a, and the upper end part thereof is provided with a terminal hole 451 in which a terminal pin P (refer to FIG. 2) is erectingly provided.

On the outside peripheral surface in the radial direction of the first flange 42a, a notch groove 46 is provided to prevent interference of the first flange 42a with a positioning pin (not shown) provided on the winding machine side when the positioning pin is set along a guide groove 33 (refer to FIG. 2)

formed at the outside periphery of the yoke part 30 to perform winding in the state in which the stator core 30 is mounted on a winding machine.

Figure 5A:
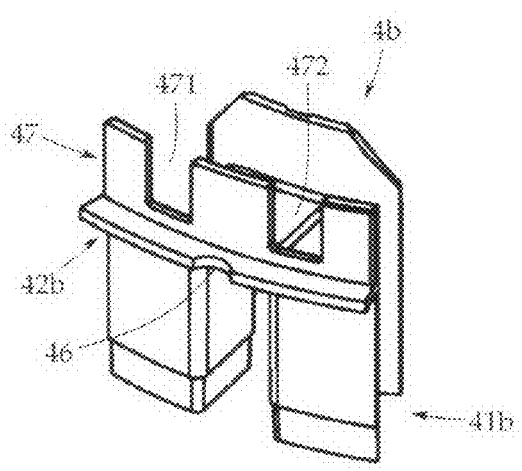
FIGS. 5A to 5C are a front perspective view, a back-side perspective view, and a plan view, respectively, of a second insulator member.
Figure 5B:
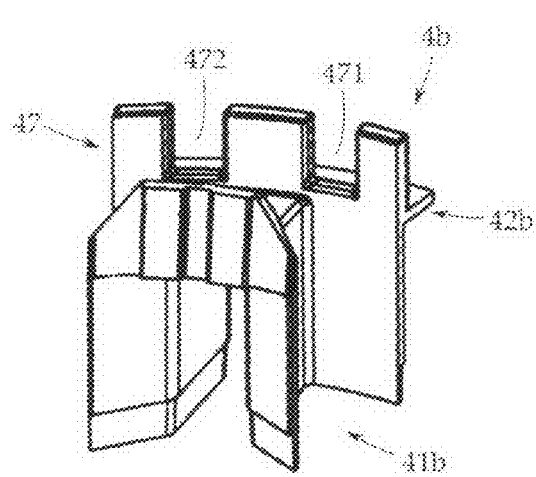
Figure 5C:
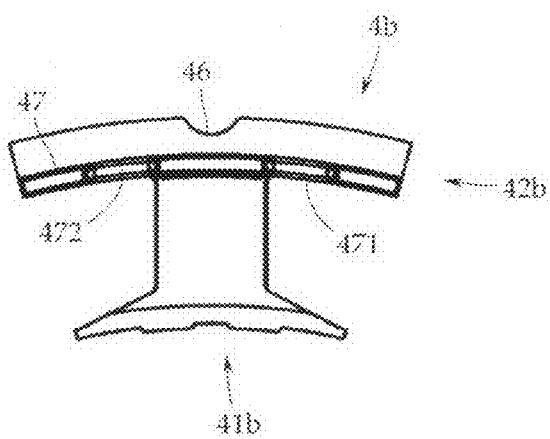

Referring to FIGS. 5A to 5C, the second insulator member 4b includes a second sleeve 41b inserted along the teeth part 32a to 32l from the lower end face of the stator core 30 and a second flange 42b formed integrally at one end (the upper end in FIG. 5A) of the second sleeve 41b.

The second sleeve 41b is formed so as to have a U-shaped cross section that covers the range from the inside peripheral surface of the yoke part 31 to the back surface of the teeth surface 32l through the coil part of the teeth part 32a, and is formed so as to be slightly longer than a half of the length in the axis line direction of the teeth part 32a.

In this embodiment, the extreme end of the second sleeve 41b is formed so as to be slightly thinner than other portions, and laps on the extreme end of the first sleeve 41a of the first insulator member 4a so that the first insulator member 4a and the second insulator member 4b engage with each other.

The second flange 42b is formed in a fan shape so as to cover a part of the lower end face of the yoke part 31 of the stator core 30. The second flange 42b also plays a role as a stopper for the second sleeve 41b inserted along the teeth part 32a to 32l from the lower end face of the stator core 30.

The second flange 42b is further provided erectingly with a guide plate 47 used for the treatment of connecting wire of the coil 5. The guide plate 47 is formed in a fan shape along the second flange 42b, and notch grooves 471 and 472 are provided at two places along the axis line direction. On the outside peripheral surface in the radial direction of the second flange 42b as well, the notch groove 46 equivalent to the notch groove of the first flange 42a is provided.

After the first and second insulator members 4a and 4b have been attached to the stator core 30, the stator core 30 is mounted on the not illustrated winding machine to wind the coil 5 on the teeth parts 32a to 32l of the stator core 30. At this time, winding is performed in the state in which the stator core 30 is installed to a special-purpose securing jig.

Figure 6A:
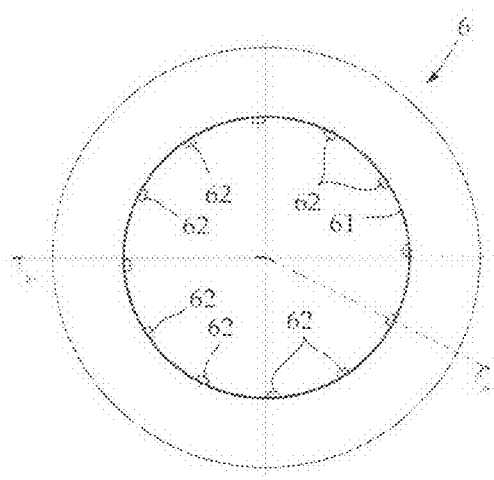
FIGS. 6A and 6B are a plan view of a securing jig for a winding machine and a sectional view taken along the line A-A.
Figure 6B:
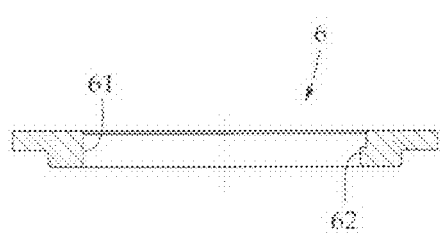

As shown in FIGS. 6A and 6B, the securing jig 6, which is made of a metal and takes a disc shape, is provided with a support hole 61, in which the stator core 30 is inserted, in the center thereof. The support hole 61 is formed so as to have a diameter approximately equal to or slightly larger than the outside diameter of the stator core 30 so that the stator core 30 is coaxially inserted therein.

On the inside peripheral surface of the support hole 61, bosses 62, which come into contact with the positioning surfaces of the stator core 30 exposed by the cut-away parts 43 of the above-described first insulator members 4a, are provided according to the number of cut-away parts 43. In this embodiment, the bosses 62 are provided at twelve places at intervals of 30 degrees.

Figure 7:
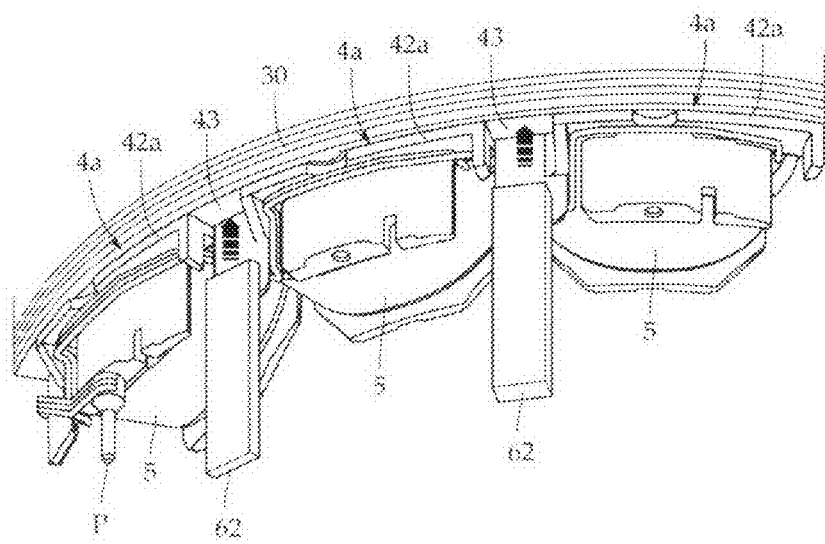
FIG. 7 is an explanatory view for explaining a procedure for positioning.

According to this configuration, as shown in FIG. 7, the stator core 30 is inserted in the support hole 61 in the securing jig 6 in the state in which the first insulator member 4a side is the downside, and the bosses 62 are aligned with the cut-away parts 43. Thereby, the bosses 62 are brought into contact with the end face of the stator core 30, and thereby the stator core 30 is supported. Therefore, the stator core 30 can be supported substantially perpendicularly to the securing jig 6 with high accuracy.

Since the stator core 30 can be supported substantially perpendicularly in the winding machine in this manner, the contact of a nozzle (not shown) for winding the coil 5 with the teeth part can be prevented. Furthermore, a slot opening (a slit-form gap between the adjacent teeth parts) can be narrowed, so that the winding space is increased. As a result, the space factor of coil is improved, so that the efficiency of the electronic motor 1 is increased.

The relative positioning of the stator core 30 with respect to the winding machine is performed by using the guide grooves 33 as described above. However, the relative positioning may be performed by using the bosses 62 and the cut-away parts 43.

In this embodiment, the insulator 4 is divided into twelve segments end-face-wise for the teeth parts 32a to 32l, respectively (a total of 24 pieces), and are combined together into a ring shape with the axis being the center. However, the segments of insulator 4 may each be integrally molded for each end face, or may be divided into two or three. It is intended to encompass those variations in the present invention as long as the insulator 4 is configured to expose a part of the end face of the stator core 30 at least at three places.

The stator shown in FIG. 2 has the coil 5 wound on the stator core 30 with the insulator 4 inbetween. However, for the actual stator 3, after the insulator 4 has been installed, the coil 5 is wound, and the whole is integrally formed of a resin by insert molding.

The invention claimed is:

1. An electronic motor comprising:
   a stator and a rotor disposed coaxially in a center of the stator,
   wherein the stator comprises a cylindrical stator core having a yoke part, and a plurality of teeth parts integrally formed with the yoke part, each projecting from an inside peripheral surface of the yoke part toward a center of the stator core, the yoke part and the teeth part being formed of metal sheets laminated together, and insulators, each surrounding the teeth part leaving at least a teeth surface of the yoke part open,
   wherein the insulator has a first sleeve extending along the teeth part from one end face of the stator core, and having a first flange formed integrally at one end of the first sleeve to cover the end face of the stator core, and a cut-away part formed in the first flange at a lateral end thereof located between two of the flanges adjacent to each other to expose a part of the end face of the yoke part so that the stator core is supported by a device passing through the cut-way part in arranging a wire, and
   wherein in the stator core, an outside peripheral surface of the yoke part is substantially the same as an outside peripheral surface of the flange of the insulator.

2. The electronic motor according to claim 1, wherein taking an outside diameter of the stator core as $\phi 1$ and an inside diameter thereof as $\phi 2$, an inside/outside diameter ratio ($\phi 2/\phi 1$) of the stator core is 70% and more.

3. The electronic motor according to claim 1, wherein the insulator further includes a second sleeve extending into the teeth part from the other end face side of the stator core and having a second flanged formed integrally at the other end of the sleeve to cover the other end of the yoke part.

4. The electronic motor according to claim 3, wherein the first and second sleeves include end portions having a thickness gradually decreasing so that the end portions overlap each other when the first and second sleeves are assembled.

5. The electronic motor according to claim 1, wherein the first flange includes a guide plate extending outwardly therefrom and having a terminal hole at an end thereof, and an L-shaped protective wall adjacent the cut-away part.

* * * * *